(12) United States Patent
Shah et al.

(10) Patent No.: US 12,344,408 B2
(45) Date of Patent: Jul. 1, 2025

(54) UNMANNED AERIAL VEHICLE (UAV)-BASED NON-INTRUSIVE BUILDING ENVELOPE MEASUREMENT SYSTEM

(71) Applicants: University of Florida Research Foundation, Inc., Gainesville, FL (US); Bipin Shah, Fairfax, VA (US)

(72) Inventors: Bipin Shah, Fairfax, VA (US); Ravi S. Srinivasan, Gainesville, FL (US)

(73) Assignees: Bipin Shah, Fairfax, VA (US); University of Florida Research Foundation, Inc., Gainesville, FL (US)

( * ) Notice: Subject to any disclaimer, the term of this patent is extended or adjusted under 35 U.S.C. 154(b) by 254 days.

(21) Appl. No.: 18/165,640

(22) Filed: Feb. 7, 2023

(65) Prior Publication Data
US 2023/0192330 A1 Jun. 22, 2023

Related U.S. Application Data

(63) Continuation of application No. PCT/US2021/044945, filed on Aug. 6, 2021.
(Continued)

(51) Int. Cl.
*G01K 1/143* (2021.01)
*B64U 20/87* (2023.01)
(Continued)

(52) U.S. Cl.
CPC ............. *B64U 20/87* (2023.01); *G01K 1/024* (2013.01); *G01K 1/08* (2013.01); *G01K 1/143* (2013.01);
(Continued)

(58) Field of Classification Search
CPC ............ G01K 1/08; G01K 1/24; G01K 1/143; G01K 1/146; G01K 17/20; G01K 7/04; B64U 10/13
See application file for complete search history.

(56) References Cited

U.S. PATENT DOCUMENTS

| 2017/0066530 | A1* | 3/2017 | Salzmann | ............. | G05D 1/0094 |
| 2017/0073071 | A1* | 3/2017 | Salzmann | ............... | B64U 10/10 |
| 2020/0012307 | A1* | 1/2020 | Scelzi | ..................... | G05B 11/01 |

FOREIGN PATENT DOCUMENTS

CN 111465129 A * 7/2020 ................ B64F 5/10

* cited by examiner

*Primary Examiner* — Jamel E Williams
(74) *Attorney, Agent, or Firm* — Thomas | Horstemeyer, LLP

(57) ABSTRACT

Embodiments of the present disclosure provide unmanned aerial vehicle-based measurement techniques for building envelope surfaces One such method comprises acquiring, by an unmanned aerial vehicle, an air velocity measurement at an external surface of the high-rise building at a point on the external surface; acquiring, by the unmanned aerial vehicle, an external temperature at the external surface of the high-rise building at the point on the external surface; acquiring, by an infrared camera sensor of the unmanned aerial vehicle, IR measurements at the external surface of the high-rise building at the point on the external surface; and transferring, by the unmanned aerial vehicle, the IR measurements and the external air velocity and temperature measurements to a remote base station, wherein a current thermal performance of the external surface of the high-rise building is determined using the external air velocity, temperature, and IR measurements.

20 Claims, 6 Drawing Sheets

Related U.S. Application Data

(60) Provisional application No. 63/062,872, filed on Aug. 7, 2020.

(51) Int. Cl.
| | |
|---|---|
| *G01K 1/024* | (2021.01) |
| *G01K 1/08* | (2021.01) |
| *G01K 1/14* | (2021.01) |
| *G01K 17/20* | (2006.01) |
| *B64U 10/13* | (2023.01) |
| *B64U 101/30* | (2023.01) |
| *G01J 5/00* | (2022.01) |
| *G01K 7/04* | (2006.01) |

(52) U.S. Cl.
CPC ............ G01K 1/146 (2013.01); G01K 17/20 (2013.01); *B64U 10/13* (2023.01); *B64U 2101/30* (2023.01); *G01J 2005/0077* (2013.01); *G01K 7/04* (2013.01)

UNMANNED AERIAL VEHICLE (UAV)-BASED NON-INTRUSIVE BUILDING ENVELOPE MEASUREMENT SYSTEM

CROSS-REFERENCE TO RELATED APPLICATION

This application claims priority to and is a continuation of PCT/US/2021-04495, filed on Aug. 6, 2021, which claims priority to U.S. provisional application entitled, "Unmanned Aerial Vehicle (UAV)-Based Non-Intrusive Building Envelope (Windows, Walls, and Roofs) Temperature, Velocity, Emissivity, and Reflectance Measurement System for Community-Wide Energy Mapping," having Ser. No. 63/062,872, filed Aug. 7, 2020, each of which is entirely incorporated herein by reference.

TECHNICAL FIELD

The present disclosure is generally related to measurement techniques for building envelope surfaces.

BACKGROUND

With the advent of energy efficient buildings, it is critical to consider all aspects of energy transfer particularly the building envelope system. Windows, walls, and roofs are among the most important building envelope components that transfer building heat with the surroundings. Techniques have been developed to determine the current U-value (thermal conductivity) of windows, walls, or roofs or an R-value (resistance value) which is generally the reciprocal of a corresponding U-value, which dictates the net heat transfer of these components. The U-value can be determined by manually measuring surface temperatures of the window, wall, or roof, including both exterior and interior surfaces, and the ambient air velocities near the surfaces, i.e., both exterior and interior surfaces as applicable. Yet, with non-operable windows in most of the high-rise buildings (e.g., at least 75 feet tall), such manual measurement of a window's exterior condition becomes a difficult task. Similarly, it is inefficient to conduct a study of individual buildings one-by-one especially when the need is at a community or city-level that comprises thousands of heterogeneous buildings.

SUMMARY

Embodiments of the present disclosure provide unmanned aerial vehicle-based measurement techniques for building envelope surfaces. One such method comprises positioning, by an unmanned aerial vehicle, an air velocity sensor within a first localized range of a point on an external surface of a high-rise building; acquiring, by the unmanned aerial vehicle, an air velocity measurement at an external surface of the high-rise building at the point on external surface; positioning, by the unmanned aerial vehicle, a temperature sensor within a second localized range of the point on the external surface of the high-rise building; acquiring, by the unmanned aerial vehicle, an external temperature at an external surface of the high-rise building at the point on the external surface; positioning, by the unmanned aerial vehicle, an infrared (IR) camera sensor within a remote distance range of the point on the external surface of the high-rise building, wherein the remote distance range is greater than each of the first localized range and the second localized range; acquiring, by the infrared camera sensor of the unmanned aerial vehicle, IR measurements at an external surface of the high-rise building at the point on the external surface; and/or transferring, by the unmanned aerial vehicle, the IR measurements and the external air velocity and temperature measurements to a remote base station, wherein a current thermal performance of the external surface of the high-rise building is determined using the external air velocity, temperature, and IR measurements.

Briefly described, one embodiment of the system, among others, comprises an unmanned aerial vehicle; an arm member extending at least 3 feet away from a base of the unmanned aerial vehicle; an air velocity sensor attached to a tip of the arm member that is opposite from an end of the arm member that is affixed to the unmanned aerial vehicle; and/or a shield enclosure coupled to the arm member that is positioned near the top of the arm member to which the air velocity sensor is attached, wherein the shield enclosure is configured to shield rotor turbulence of the unmanned aerial vehicle from the air velocity sensor.

In one or more aspects for such systems/methods, the current thermal performance is represented by a U-value or an R-value for the external surface of the high-rise building; the external surface comprises a glass window; the air velocity sensor comprises a hot-wire anemometer; the temperature sensor (e.g., attached to the tip of the arm member) comprises an infrared point thermocouple; the first localized range is less than the second localized range; the first localized range is the same as the second localized range; the first localized range is four inches or less and the second localized range is three feet or less; the external surface is on a side surface or a top surface of the building; the infrared camera sensor comprises a thermal infrared camera sensor (e.g., affixed to a base of the unmanned aerial vehicle); and/or an air moisture sensor is attached to the tip of the arm member.

In one or more aspects for such systems/methods, an exemplary system/method can further perform operations comprising securing the air velocity sensor or the temperature sensor to the unmanned aerial vehicle with an arm member that extends at least 3 feet away from a base of the unmanned aerial vehicle; wherein both the air velocity sensor and the temperature sensor are attached to a tip of the arm member; comparing the current thermal performance of the external surface to a nominal value of thermal performance associated with the external surface; estimating an amount of energy loss resulting from a degradation of the external surface due to a difference between the current thermal performance and the nominal thermal performance for the external surface; acquiring an air moisture measurement at the external surface of the high-rise building at the point on the external surface; and/or shielding the air velocity sensor from rotor turbulence of the unmanned aerial vehicle.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
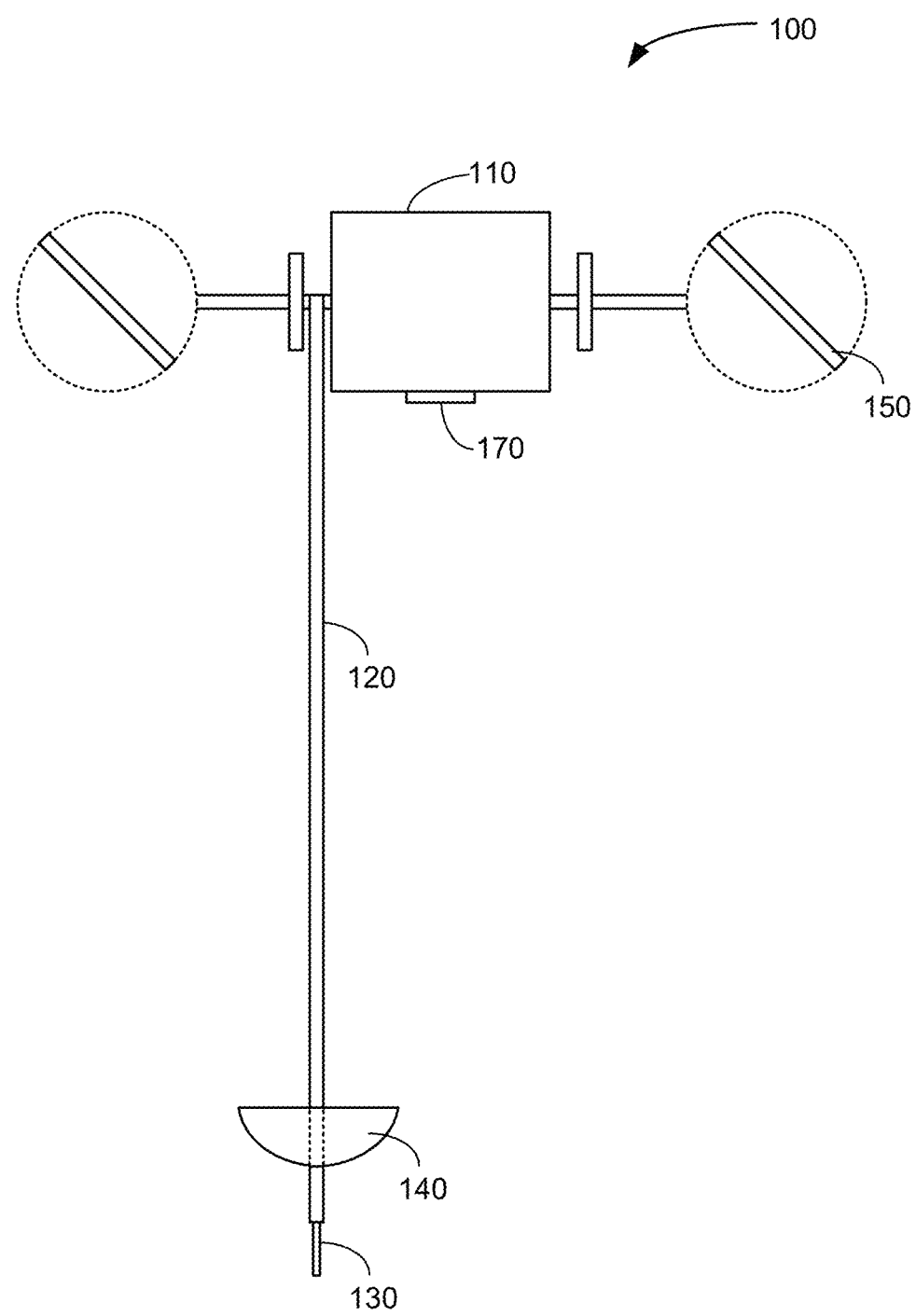
FIGS. 1-4 show a top view (FIG. 1) and side views (FIGS. 2-4) of exemplary embodiments of an unmanned aerial vehicle (UAV)-based non-intrusive building envelope energy measurement system in accordance with the present disclosure.

An average home or building may lose 30% of its heat or air-conditioning energy through its windows by conduction, convection, radiation, and air leakage. Hard water and hard minerals are the principal cause of glass degradation followed by oxidation and corrosion for metal frame windows. This degradation affects the U-values (representing thermal conductivity) and R-values (representing a resistance to heat flow) which dictates the net heat transfer of the building structure.

The present disclosure describes various embodiments of systems, apparatuses, and methods of point measurements of surface temperatures and/or air velocities at an external surface of building structures, such as, but not limited to, glass windows, walls, and roof surfaces of a building structure. In various embodiments, an exemplary unmanned aerial vehicle (UAV)-based non-intrusive building envelope energy measurement system (also referred to as an UAV-based measurement system) can be implemented to conduct rapid field measurements of exterior surfaces of windows (e.g., non-operable windows or windows that are not configured to be opened from a building interior) and roofs of buildings (e.g., skylights) that may be beyond reach for manual measurements and/or may be more accurately and/or more easily obtained using an exemplary UAV-based measurement system. Accordingly, the UAV can be remotely piloted or can be programmed to position (e.g., autopilot) a measurement sensor at the optimal measuring point of a building envelope, such as a center of a glass window which can be used in calculating a glazing U-factor value for the glass window. Thus, in some embodiments, a drone can be programmed with geolocated data on where a measurement needs to be acquired at a building structure, such that the drone is capable of departing from or near a base station, acquire the measurement data, and return to/near the base station. For example, an exemplary UAV vehicle 110 may be capable of programmable movement with no or limited human oversight. Such programmable movement can be based on either locally generated path waypoints or waypoints generated by a remote computing device and communicated to the drone.

In general, windows used in commercial building and residential homes feature various amounts of glazing to provide improved energy efficiency, and the glazing performance of these windows can change over time. A single glazed window has a single pane of glass. Correspondingly, a double glaze window has a double pane of glass with a spacer in between. The individual panes may also be coated with a substance that is designed to have low emittance to reduce both thermal radiation and solar heat gain. Cavity of double glazed windows may contain inert gases, such as Argon and Krypton, that have a conductivity lower than Air, which reduces thermal heat transfer. One good reason to change a window is that glazing performance of the glass degrades over time (which can be due to degradation of functionality of any layer of the window, whether glass, coating, or gas). Thus, there is a need for an efficient process for determining a current thermal performance of the glazing.

Figure 2:
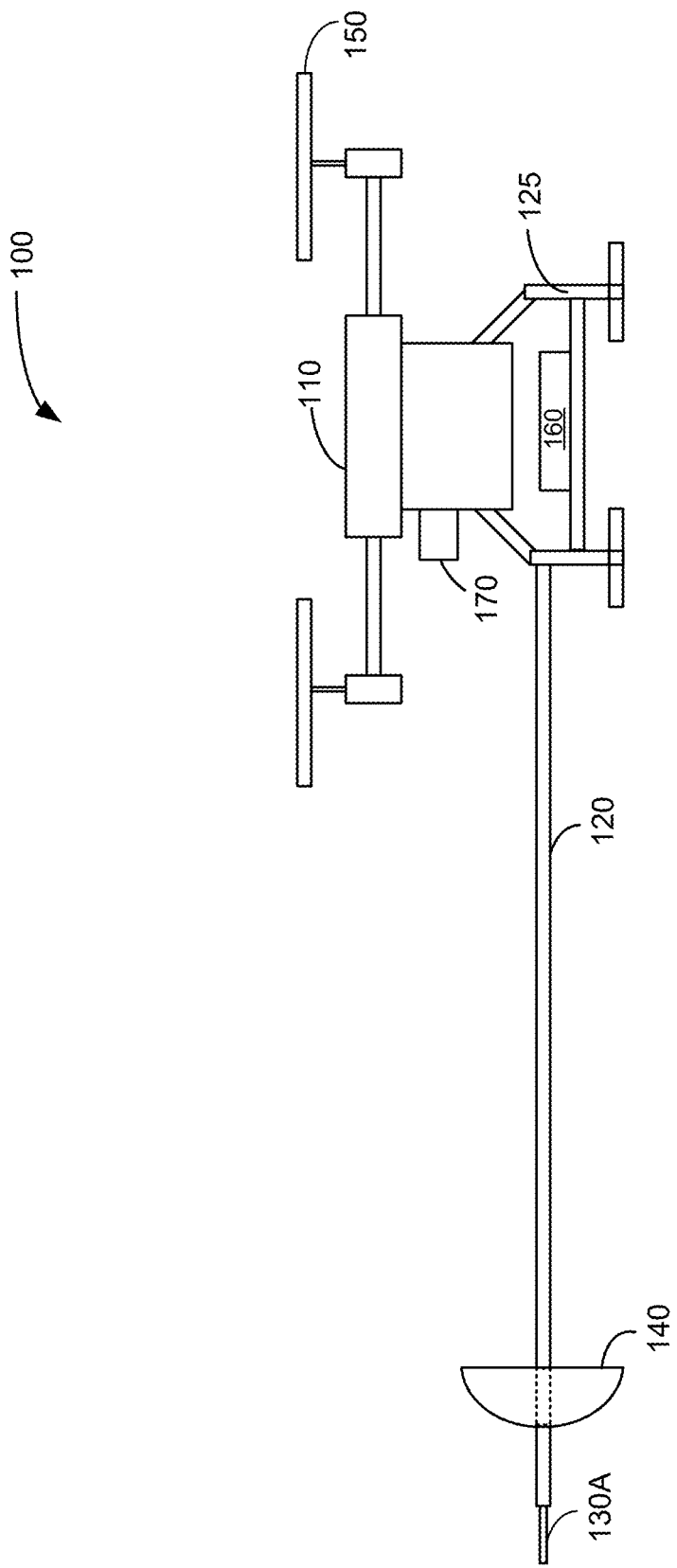

Referring to FIG. 1, a top view of an exemplary UAV-based measurement system 100 is shown, in accordance with various embodiments of the present disclosure. For the system, an unmanned aerial vehicle 110 is equipped or configured with an arm member 120 (such as a cylindrical, lightweight pole) that extends from a body of the unmanned aerial vehicle 110. Correspondingly, FIG. 2 shows a side view of the UAV-based measurement system of FIG. 1.

In one embodiment, the arm member 120 is strapped to the UAV landing gear by a clamp. In other embodiments, the arm member may be affixed to the UAV landing gear 125 or UAV body by various clamping mechanisms, adhesives, welds, screws, etc. In various embodiments, the UAV landing gear may have a platform to which one or more control unit(s) 160 (e.g., that may include sensor controller(s), flight controller(s), global positioning system (GPS) circuitry, wireless transceiver units, sensor hardware, etc.) may be fastened via cable ties, screws, tape, bolts, or other types of fastening mechanisms, in which the arm member may be fastened to the control unit(s) 160 directly, such as via a screw member at the end of the arm member 120 opposite from the measurement sensor/probe 130. While the arm member 120 is shown offset from a center of a base of the UAV vehicle or drone in FIG. 1, the arm member 120 is not limited to being affixed in an offset position (e.g., can be positioned at a center of the base). While the UAV vehicle is shown with two rotor blades in FIG. 1, embodiments of the present disclosure are not limited to having two rotor blades and may have more than two rotor blades.

A height that the UAV vehicle can reach during flight depends on the performance capability of the UAV vehicle (e.g., different models of UAV drones may have different performance capabilities). In certain implementations the cellular or network connectivity of the UAV 110 allows communication during acquisition of measurement data, allowing measurement data to be communicated to the control unit(s) 160 or other components and/or allowing the control unit(s) 160 to communicate changes to a flight plan to a given UAV 110.

Figure 3:
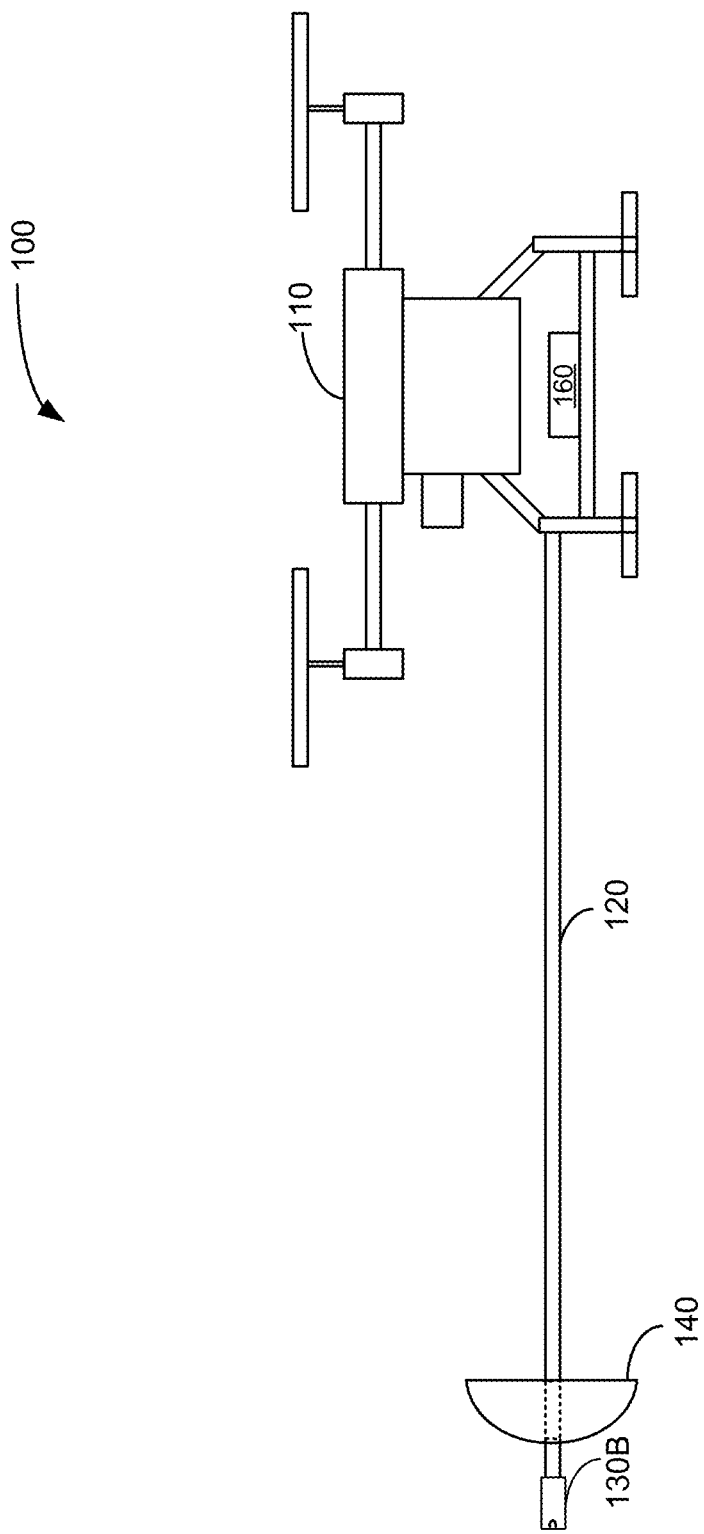
Figure 4:
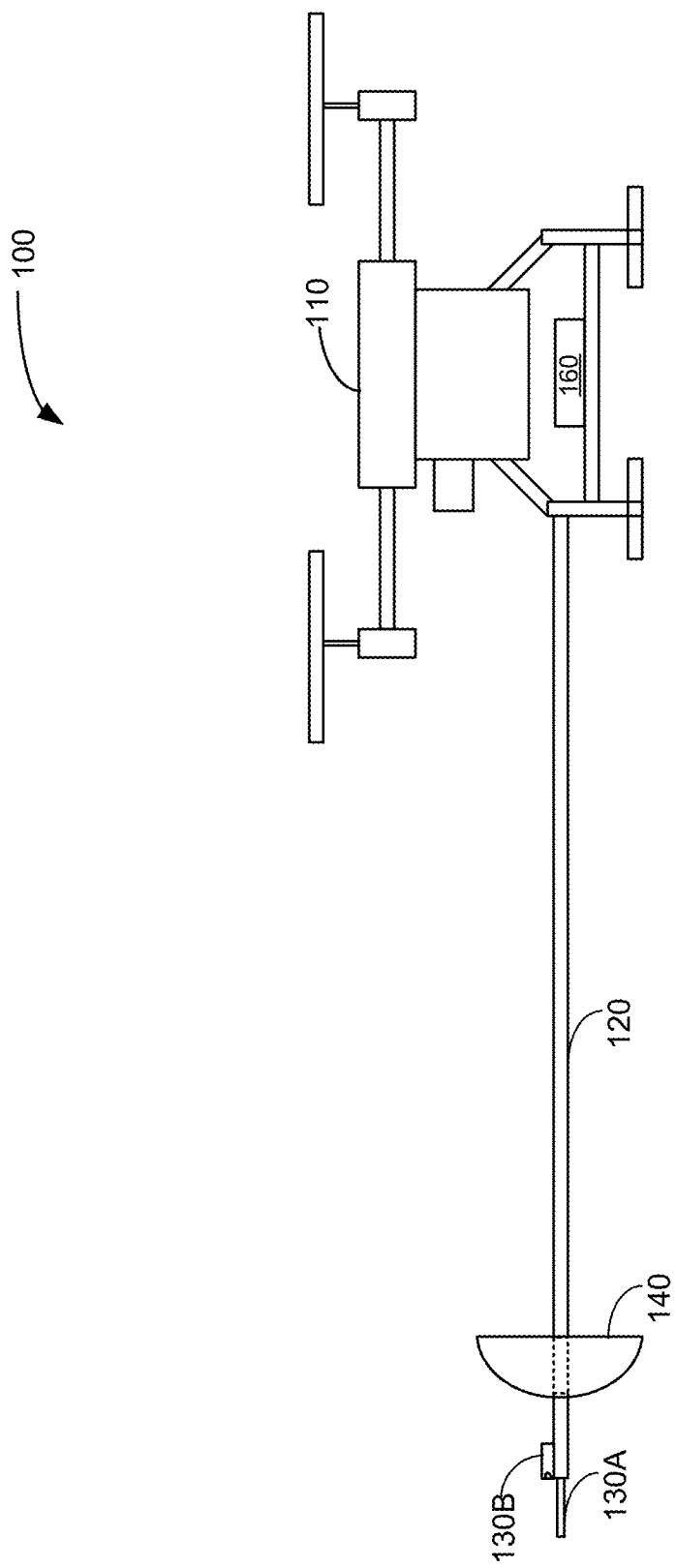
Figure 5:
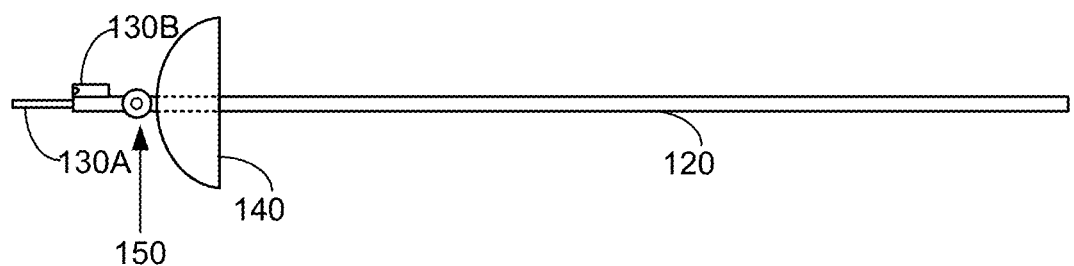
FIGS. 5-6 show an exemplary arm member of a UAV-based measurement system having a hinge mechanism in accordance with various embodiments of the present disclosure.
Figure 6:
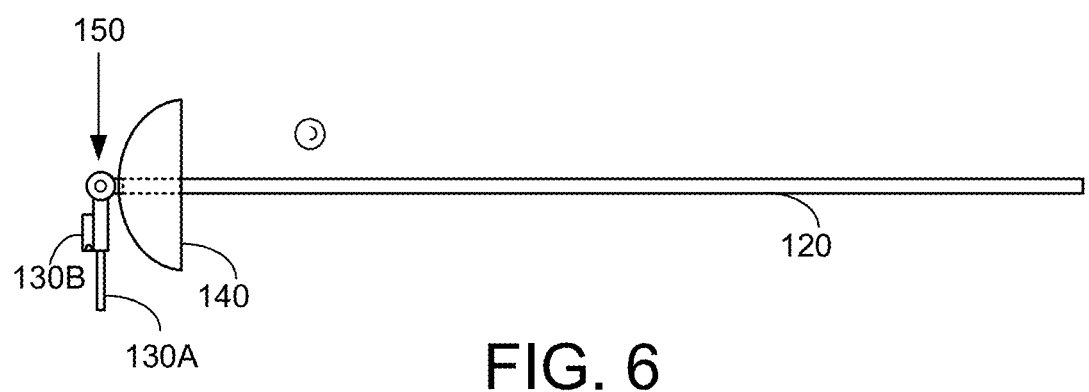

In various embodiments, the arm member 120 extends at least 3 feet away from the body of the unmanned aerial vehicle 110. In other embodiments, this distance may be modified based on the turbulence of the unmanned aerial vehicle 110. At the end of the arm member 120 (opposite from the body of the unmanned aerial vehicle or drone 110), one or more measurement probes or sensors 130 are affixed or attached to measure an external environmental parameter of an exterior surface of a building envelope (such as a glass window). In various embodiments, the measurement probes/sensors include an air velocity sensor (e.g., hot wire anemometer), a temperature sensor (e.g., infrared point thermocouple), and/or a hygroscopic moisture sensor (e.g., a humidity sensor that measures air moisture) that are able to make point measurements on the exterior surface of the building envelope. In one embodiment, as represented in FIG. 1, an individual first sensor 130 may be mounted on the end of the arm member 120 and the UAV may be deployed to obtain a sensor measurement using the first sensor at a local point on the envelope surface before the first sensor is removed and replaced with a second sensor and then deployed again to obtain a different type of sensor measurement at a point on the envelope surface using the second sensor. Accordingly, in one embodiment, an exemplary UAV 110 is integrated with an air velocity measurement sensor 130A (FIG. 2) to measure the air velocity in the local vicinity of an exterior side of a building envelope (e.g., within 4 inches of building surface), such as building windows, and is equipped with a temperature measurement sensor 130B (FIG. 3) to measure surface temperatures of the building envelope in a local vicinity (e.g., within 3 feet of building surface). Correspondingly, in various embodiments, other types of sensors (e.g., a hygroscopic moisture sensor) or combinations of sensors can be integrated with the exemplary UAV 110. In other embodiments, multiple sensors or probes 130A, 130B may be affixed at a tip of the arm member 120, as represented in FIG. 4, such that different types of measurement may be obtained during a single trip of the UAV vehicle within a local vicinity of a building envelope (e.g., within 4 inches of building surface). Further, in some embodiments, a hinge mechanism 150 (e.g., ball joint hinge, rotary hinge, etc.) may be part of the arm member 120 such that the tip of the arm member can rotate and allow for the probe/sensor attachment(s) 130A,B to be configured to point various angles of rotation. For example, FIG. 5 shows an arm member 120 and tip sensors 130A, B coupled to a hinge mechanism 150 that is configured to point the tip sensor(s) in a 0 or 180 degree orientation away from an end of the arm member 120. Correspondingly, FIG. 6 shows the arm member 120 and tip sensors 130A, B coupled to the hinge mechanism 150 that is configured to point the tip sensor(s) in an 90 or 270 degree orientation away from an end of the arm member 120. In this way, the UAV 110 may hover over a top of a building structure while the tip probe/sensor points down towards a top surface of the building structure. Thus, in various embodiments, the UAV-based measurement system 100 can be deployed to acquire air velocity measurements near a top surface that can be used to calculate energy loss (such as in energy units or converted to dollar amounts) for a top portion of the building structure (e.g., shingles, sunlight, etc.). In comparison, conventional methods often are limited to only using thermal measurements for roof structures. However, in accordance with various embodiments, an exemplary UAV-based measurement system can utilize thermodynamic equations to estimate a U-value or R-value of a roof structure based on both thermal and air velocity local measurements at a top surface of a building structure. Correspondingly, after calculating the U-value or R-value of the roof surface, a relative thermal degradation of insulative properties of the roof structure can be determined by an exemplar UAV-based measurement system using the original design or engineering specifications for the building structure. Similarly, in various embodiments, an integrated hygroscopic moisture sensor can be sued to determine the hygroscopic impact on building envelope components based on acquired air moisture readings at building surfaces.

Referring back to FIG. 1, near the measurement probe/sensor ("tip sensor") 130 is a shield structure 140 affixed to the arm member 120, in one embodiment. The shield structure 140 helps eliminate an impact of turbulence created by rotors 150 of the UAV (while in operation) on measurement readings (e.g., wind velocity) at a tip of the arm member 120 and an external surface of the building envelope by shielding the tip of the arm member 130 from rotor turbulences. Thus, the shield structure 140 can enable the measurement of free-stream air velocities and temperature at an external surface of a building structure (such as a glazing surface of a glass window) that is outside a turbulence zone of the UAV vehicle 110. In various embodiments, the shield structure 140 is positioned at a distance of 6 inches away from the tip of the arm member 120 (e.g., placed at a distance of 3 feet from a base of the UAV on a 3.5 feet arm member). In various embodiments, the shield structure has, but is not limited to having, a curved cup-like shape.

To obtain U-value measurements for a building envelope, the UAV 110 can be equipped with air velocity sensors and surface temperature sensors. In various embodiments, a hot-wire anemometer can be used to measure air velocity and temperature at glazing surfaces of building windows which is more accurate and sensitive than alternative air velocity sensors or meters, such as a wane meter. The measurement of free-stream air velocity and temperature at a glazing surface is accordance with the requirements of the International Organization for Standardization (ISO) 15099 (Thermal Performance of Windows, Doors and Shading Device), Section 8.3.1.1. For accurate glazing analysis, local measurements of air velocity and temperature at the glazing surface are required, which can be achieved by an exemplary embodiment of UAV-based measurement system having a hot-wire anemometer tip.

In various embodiments, one or more camera(s) 170 are equipped to the UAV vehicle 110 (e.g., a UAV base) and may be used for various applications, such as navigation, monitoring, and/or sensing applications along with global positioning system (GPS) application(s). For example, in one embodiment, a camera capable of infrared thermography (IRT) and/or hyperspectral imaging is provided to conduct external thermal measurements at remote distances which can be used in situations where local measurements are not required. Accordingly, in various embodiments, a thermal infrared (TIR) camera sensor can be used to acquire images or video that capture a temperature of external surfaces. In various embodiments, such an infrared (IR) camera sensor 170 of the UAV can be used to acquire an infrared image of a point on an external surface of a high-rise building in addition to the temperature and velocity measurements acquired via measurement sensor(s) 130.

After acquisition of surface measurements of the building envelope by an exemplary UAV-based measurement system 100, the measurement values can be stored in memory (e.g., logged in real-time) of the control circuitry 160 and/or transmitted, via the wireless transceiver, to a remote base station or computer device using one or more communication channels and protocols, including cellular, short range, WiFi communications, among others. In various embodiments, a U-factor can be computed based on the acquired measurements at the remote computer device and/or by the UAV control circuitry.

For example, in one embodiment, a U-factor of a glass window structure can be computed using the following equation:

$$U = \frac{1}{\left(\frac{1}{h1}\right) + \left(\frac{1}{Cs}\right) + \left(\frac{1}{h2}\right)}$$

where $h_1$ represents an exterior surface coefficient of convection for the glass window structure, $h_2$ represents an interior surface coefficient of convection for the glass window structure, and $C_s$ is the conductance of the glazing. $h_1$ can be determined based on the acquired air velocity readings at the external surface of the glass window structure using an exemplary UAV-based measurement system and $C_s$ can be determined based on the acquired external temperature readings at the external surface of the glass window structure. Correspondingly, measurement readings for an interior surface of the glass window surface can be acquired using conventional manual measurement techniques.

To illustrate, the surface coefficients of convection can be calculated using the equations given below:

$$h_1 = 4 + 4V_{s1}$$

$$h_2 = 7.67 \; W/(sq \cdot m \cdot K)$$

where $V_{s1}$ is the free stream velocity in meters per second on the outside of the window structure, as acquired by an exemplary UAV-based measurement system, and $h_2$ is a constant value reliant on inside conditions of the building structure based on natural convection condition which typically exits.

For evaluation purposes, a single representative window of a building structure was selected for an entire set of window orientation and measurements were taken at its center point. Two separate test runs of an exemplary UAV-based measurement system were performed to collect data for each of wind velocity and temperature at the center point of the window within 4 inches to the window surface. For example, a UAV drone 110 that was used for this set of test runs was equipped with an arm member 120 and tip sensor 130 (e.g. hot-wire anemometer sensor) along with being equipped with a shield structure, and having a remote computer device in communication with the UAV drone. Based on acquired spot or point-measurement values from a test run of the equipped UAV drone adjacent to an external surface of a window for the building structure, window U-values were computed and evaluated against simulated U-values determined using WINDOW®, a simulation software developed by U.S. Department of Energy.

The table below shows a comparison of interior surface temperatures recorded using conventional techniques & exterior surface temperatures recorded using an IR thermocouple (error of +/−1 degrees centigrade) of an exemplary UAV-based measurement system. The recorded temperatures are compared expected surface temperatures of a glazing system simulated modeled using the WINDOW® software under optimal or default conditions, in which the experimental temperature (steady state) and wind velocity measurements were used to create a new environmental condition in WINDOW® and these environmental conditions were used to execute the simulation. The table shows that the actual recorded measurements indicate a degradation in glazing properties of the window structure, as an interior of the glass is expected to have an approximate 11 degree decrease in temperature from the external temperature of 23.4 degrees Centigrade, whereas no decrease in temperature was actually observed. Accordingly, such analysis can show the degradation of window performance over time and current temperature measurements or U-factor values of a building envelope structure in the field can be compared with optimal or default U-factor values for the building envelope structure and estimated temperature readings under optimal or default conditions.

TABLE 1

| Surface | Temperature from WINDOW® | Recorded Temperature |
|---|---|---|
| Exterior of glass | 23.4 degree centigrade | 23.0 degree centigrade |
| Interior of glass | 22.6 degree centigrade | 23.2 degree centigrade |

As a result, understanding the effects of degradation on windows over time not only paves the way to an energy efficient future but also promises consumers substantial monetary benefits. Energy Star studies show that replacing single pane windows with double pane can save between 21% and 31% off of heating and cooling costs. A 1-degree increase in a thermostat setting, increases energy use by 2%. Department of Energy estimates that consumers can save $125 to $465 dollars a year just by getting replacement windows with Energy Star ratings. Accordingly, exemplary embodiments of a UAV-based measurement system can compute a U-value or R-value of external surfaces of a building structure based on thermal and/or air velocity local measurements. Correspondingly, after calculating the U-value or R-value of the external surface(s), a relative thermal degradation of insulative properties of the external structure(s) (e.g., windows, skylights, walls, and roofs) can be determined using the original design or engineering specifications for the building structure. For example, a current thermal performance of an external surface of a building structure can be compared, by an exemplary UAV-based measurement system, to a nominal value of thermal performance associated with the external surface, such that an amount of energy loss resulting from a degradation of the external surface can be computed or estimated, by the exemplary UAV-based measurement system, due to a difference between the current thermal performance and the nominal thermal performance for the external surface.

Figure 7:
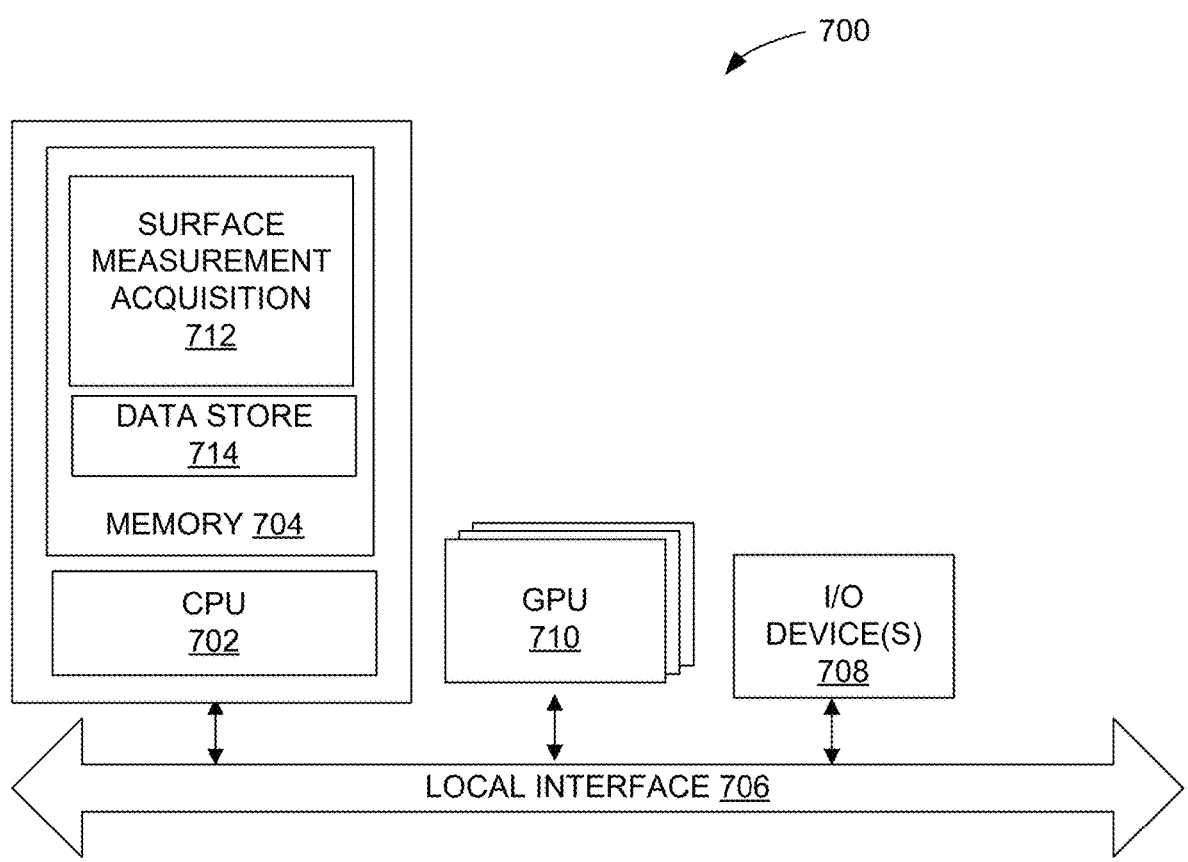
FIG. 7 depicts a schematic block diagram of a computing device that can be used to implement various embodiments of the present disclosure.

FIG. 7 depicts a schematic block diagram of a computing device 700 that can be used to implement various embodiments of the present disclosure, such as, but not limited to, a remote base station computing device or control unit 160 that can be part of a UAV-based measurement system. An exemplary computing device 700 includes at least one processor circuit, for example, having a processor 702 and a memory 704, both of which are coupled to a local interface 706, and one or more input and output (I/O) devices 708. The local interface 706 may comprise, for example, a data bus with an accompanying address/control bus or other bus structure as can be appreciated. The computing device 700 further may include Graphical Processing Unit(s) (GPU) 710 that are coupled to the local interface 706 and may utilize memory 704 and/or may have its own dedicated memory.

Stored in the memory 704 are both data and several components that are executable by the processor 702. In particular, stored in the memory 704 and executable by the processor 702 are code for acquiring surface measurements 712 and related code or instructions. Also stored in the memory 704 may be a data store 714 and other data. In addition, an operating system may be stored in the memory 704 and executable by the processor 702. The I/O devices 708 may include input devices, for example but not limited to, a keyboard, mouse, sensor(s), camera(s) etc. Furthermore, the I/O devices 708 may also include output devices, for example but not limited to, a printer, display, etc.

Certain embodiments of the present disclosure can be implemented in hardware, software, firmware, or a combination thereof. If implemented in software, the surface measurement acquisition logic or functionality are implemented in software or firmware that is stored in a memory and that is executed by a suitable instruction execution system. If implemented in hardware, the surface measurement acquisition logic or functionality can be implemented with any or a combination of the following technologies, which are all well known in the art: discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

Therefore, at least the following is claimed:

1. An unmanned aerial vehicle-based measurement method comprising:
    positioning, by an unmanned aerial vehicle, an air velocity sensor within a first localized range of a point on an external surface of a high-rise building;
    acquiring, by the unmanned aerial vehicle, an air velocity measurement at the external surface of the high-rise building at the point on external surface;
    positioning, by the unmanned aerial vehicle, a temperature sensor within a second localized range of the point on the external surface of the high-rise building;
    acquiring, by the unmanned aerial vehicle, an external temperature at an external surface of the high-rise building at the point on the external surface;
    positioning, by the unmanned aerial vehicle, an infrared (IR) camera sensor within a remote distance range of the point on the external surface of the high-rise building, wherein the remote distance range is greater than each of the first localized range and the second localized range;
    acquiring, by the IR camera sensor of the unmanned aerial vehicle, IR measurements at the external surface of the high-rise building at the point on the external surface; and
    transferring, by the unmanned aerial vehicle, the IR measurements and external air velocity and temperature measurements to a remote base station, wherein a current thermal performance of the external surface of the high-rise building is determined using the external air velocity, temperature, and IR measurements.

2. The method of claim 1, wherein the current thermal performance is represented by a U-value or an R-value for the external surface of the high-rise building.

3. The method of claim 1, wherein the external surface comprises a glass window.

4. The method of claim 1, wherein the air velocity sensor comprises a hot-wire anemometer.

5. The method of claim 1, wherein the temperature sensor comprises an infrared point thermocouple.

6. The method of claim 1, wherein the first localized range is less than the second localized range.

7. The method of claim 1, wherein the first localized range is the same as the second localized range.

8. The method of claim 1, wherein the first localized range is four inches or less and the second localized range is three feet or less.

9. The method of claim 1, further comprising securing the air velocity sensor or the temperature sensor to the unmanned aerial vehicle with an arm member that extends at least 3 feet away from a base of the unmanned aerial vehicle.

10. The method of claim 9, wherein both the air velocity sensor and the temperature sensor are attached to a tip of the arm member.

11. The method of claim 1, further comprising comparing the current thermal performance of the external surface to a nominal value of thermal performance associated with the external surface, the method further comprising estimating an amount of energy loss resulting from a degradation of the external surface due to a difference between the current thermal performance and the nominal value of thermal performance for the external surface.

12. The method of claim 1, wherein the external surface is on a side surface or a top surface of the high-rise building.

13. The method of claim 1, wherein the IR camera sensor comprises a thermal infrared camera sensor.

14. The method of claim 1, further comprising acquiring, by the unmanned aerial vehicle, an air moisture measurement at the external surface of the high-rise building at the point on the external surface.

15. The method of claim 1, further comprising shielding the air velocity sensor from rotor turbulence of the unmanned aerial vehicle.

16. An unmanned aerial vehicle-based measurement system comprising:
    an unmanned aerial vehicle;
    an arm member extending at least 3 feet away from a base of the unmanned aerial vehicle;
    an air velocity sensor attached to a tip of the arm member that is opposite from an end of the arm member that is affixed to the unmanned aerial vehicle; and
    a shield enclosure coupled to the arm member that is positioned near a top of the arm member to which the air velocity sensor is attached, wherein the shield enclosure is configured to shield rotor turbulence of the unmanned aerial vehicle from the air velocity sensor.

17. The unmanned aerial vehicle-based measurement system of claim 16, further comprising a temperature sensor attached to the tip of the arm member.

18. The unmanned aerial vehicle-based measurement system of claim 17, wherein the air velocity sensor comprises a hot-wire anemometer and the temperature sensor comprises an infrared point thermocouple.

19. The unmanned aerial vehicle-based measurement system of claim 18, further comprising a thermal infrared camera affixed to a base of the unmanned aerial vehicle.

20. The unmanned aerial vehicle-based measurement system of claim 18, further comprising an air moisture sensor attached to the tip of the arm member.

* * * * *